(12) United States Patent
Payne et al.

(10) Patent No.: US 11,479,107 B2
(45) Date of Patent: Oct. 25, 2022

(54) SELECTIVELY ATTACHABLE AND DETACHABLE AXIAL HUB MOTOR

(71) Applicant: Toyota Motor Engineering & Manufacturing North America, Inc., Plano, TX (US)

(72) Inventors: Joshua D. Payne, Ann Arbor, MI (US); Nathan C. Westover, New Hudson, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 554 days.

(21) Appl. No.: 16/588,195

(22) Filed: Sep. 30, 2019

(65) Prior Publication Data
US 2021/0094407 A1    Apr. 1, 2021

(51) Int. Cl.
*B60K 7/00*    (2006.01)
*B60B 27/00*   (2006.01)
*B60L 7/10*    (2006.01)
*H02K 7/18*    (2006.01)

(52) U.S. Cl.
CPC ........ *B60K 7/0007* (2013.01); *B60B 27/0015* (2013.01); *B60B 27/0047* (2013.01); *B60L 7/10* (2013.01); *H02K 7/1846* (2013.01); *B60K 2007/0038* (2013.01)

(58) Field of Classification Search
CPC .......... B60K 7/0007; B60K 2007/0092; B60K 2007/0038
See application file for complete search history.

(56) References Cited

U.S. PATENT DOCUMENTS

| | | | |
|---|---|---|---|
| 4,021,690 A * | 5/1977 | Burton | B60B 3/02 310/67 R |
| 4,389,586 A * | 6/1983 | Foster | B60K 7/0007 310/67 R |
| 4,532,689 A | 8/1985 | Harder et al. | |
| 7,825,616 B2 | 11/2010 | Clark et al. | |
| 8,342,612 B2 | 1/2013 | Sgherri et al. | |
| 8,459,386 B2 * | 6/2013 | Pickholz | B60K 7/0007 180/65.6 |

(Continued)

FOREIGN PATENT DOCUMENTS

| | | |
|---|---|---|
| CN | 102897016 A | 1/2013 |
| CN | 107160995 A | 9/2017 |

(Continued)

*Primary Examiner* — Brian L Swenson
(74) *Attorney, Agent, or Firm* — Christopher G. Darrow; Darrow Mustafa PC

(57) ABSTRACT

Systems, methods, and other implementations described herein relate to a hub motor for a wheel of a vehicle. In one embodiment, the hub motor includes a cylindrical rotor and a cylindrical stator coaxially spaced from the cylindrical rotor along an axle. The cylindrical rotor includes a rotor attachment to selectively couple the cylindrical rotor to the axle. The cylindrical stator is disposed between the cylindrical rotor and the wheel and includes stator attachments to selectively couple the cylindrical stator to an outer wheel surface of the wheel. The cylindrical rotor and the cylindrical stator are selectively attachable to the axle and the outer wheel surface, respectively, without removing the wheel from the vehicle.

20 Claims, 7 Drawing Sheets

(56) References Cited

U.S. PATENT DOCUMENTS

| | | |
|---|---|---|
| 8,746,396 B2 | 6/2014 | Vallejo et al. |
| 8,752,660 B2 | 6/2014 | Ajisaka |
| 8,925,659 B2 | 1/2015 | Peters |
| 8,955,793 B2 | 2/2015 | Sullivan |
| 9,216,612 B2 | 12/2015 | Zdrahal et al. |
| 9,248,733 B2 | 2/2016 | Mair et al. |
| 9,428,265 B2 | 8/2016 | Cox |
| 9,475,342 B2 | 10/2016 | Feng |
| 9,616,706 B2 | 4/2017 | Benoit, Jr. |
| 9,688,099 B2 | 6/2017 | Niemczyk |
| 2004/0021437 A1 | 2/2004 | Maslov et al. |
| 2007/0096586 A1* | 5/2007 | Cros .................. H02K 1/187 310/67 R |
| 2007/0251742 A1 | 11/2007 | Adams, III et al. |
| 2007/0257570 A1 | 11/2007 | Walter et al. |
| 2008/0023237 A1 | 1/2008 | Houle |
| 2011/0094807 A1* | 4/2011 | Pruitt .................. B60L 50/40 180/65.6 |
| 2013/0333966 A1* | 12/2013 | Bryant .................. B62D 15/00 180/65.51 |
| 2014/0125205 A1 | 5/2014 | Landfors et al. |
| 2019/0023128 A1* | 1/2019 | Tesar .................. B60K 17/08 |
| 2019/0134474 A1 | 5/2019 | Schneiter |
| 2019/0383340 A1* | 12/2019 | Seaman ............. B60B 27/0052 |
| 2021/0061005 A1 | 3/2021 | Galang et al. |
| 2021/0061095 A1 | 3/2021 | Galang et al. |
| 2021/0094406 A1 | 4/2021 | Payne et al. |
| 2021/0094407 A1 | 4/2021 | Payne et al. |

FOREIGN PATENT DOCUMENTS

| | | |
|---|---|---|
| DE | 2803739 A1 | 8/1978 |
| EP | 2340953 A1 | 6/2011 |
| GB | 190928475 A | 6/1910 |
| JP | 2017043213 A | 3/2017 |
| SU | 1661004 A1 | 7/1991 |

* cited by examiner

SELECTIVELY ATTACHABLE AND DETACHABLE AXIAL HUB MOTOR

TECHNICAL FIELD

The subject matter described herein relates, in general, to selectively attachable axial hub motor, and, more particularly, to an axial hub motor that may be attached or detached without removal of a wheel from a vehicle.

BACKGROUND

A wide variety of electrified vehicles are increasing the use of electric motors into the hubs of wheels, particularly automotive electric vehicles. Typically, designs of hub motors integrate the hub motors with the wheels and may not provide for removal without first removing the entire wheel. For example, when one of the hub motor components fails or needs an upgrade, removing the hub motor/wheel assembly may be the only option. The integrated hub motor and wheel assembly is heavy and expensive. Thus, to remove, replace, repair, or service the hub motor, the vehicle user typically needs a dedicated service facility and trained service technicians. As such, there is a need for a cost-effective method of servicing the hub motor that incorporates accessibility to hub motor components by a vehicle user.

SUMMARY

Example systems and methods are disclosed herein that relate to a hub motor that is attachable to and detachable from a wheel without removing the wheel from a vehicle. As previously mentioned, typical hub motor and wheel assemblies are integrated, making them, e.g., expensive, heavy, unserviceable, etc. In one aspect, the hub motor incorporates a modular functionality such that it is removable and replaceable without disturbing the connection of the wheel to the vehicle. In other words, the hub motor is separable from the wheel. Additionally, in one embodiment, the location of the hub motor is toward the outside of the wheel, thus facilitating access to components of the hub motor, namely the rotor and the stator. Accordingly, the separability of the hub motor with the wheel and the location of the rotor and stator relative to the wheel permit a vehicle user to attach or detach the hub motor while leaving the wheel and associated tire mounted to the vehicle. In this way, decoupling the hub motor from the wheel increases the serviceability of hub motor components. Moreover, this decoupling functionality provides flexibility such that wheels without hub motors can now receive modular hub motor components, which can reconfigure the vehicle for various uses, e.g., front-wheel drive, rear-wheel drive, all-wheel drive, etc.

In one embodiment, a hub motor for a wheel of a vehicle is disclosed. The hub motor includes a cylindrical rotor and a cylindrical stator coaxially spaced from the cylindrical rotor along an axle. The cylindrical rotor includes a rotor attachment to selectively couple the cylindrical rotor to the axle. The cylindrical stator is disposed between the cylindrical rotor and the wheel and includes stator attachments to selectively couple the cylindrical stator to an outer wheel surface of the wheel. The cylindrical rotor and the cylindrical stator are selectively attachable to the axle and the outer wheel surface, respectively, without removing the wheel from the vehicle.

In another embodiment, a method of manufacturing a hub motor system for a vehicle is disclosed. The hub motor system includes an axle extending away from the vehicle in an axial direction to an outer end of the axle. The hub motor system includes a rotatable wheel having a rotational axis coinciding with the axial direction, and the rotatable wheel has an outer wheel surface. Further, the hub motor system includes a hub motor having a cylindrical rotor and a cylindrical stator. The method includes supporting the rotatable wheel on the axle by at least one wheel bearing. The method also includes coupling the cylindrical stator to the outer wheel surface at stator attachments of the cylindrical stator such that the cylindrical stator is arranged between the outer wheel surface and the outer end in the axial direction. The method also includes coupling the cylindrical rotor to the axle via a rotor attachment of the cylindrical rotor, such that the cylindrical rotor is arranged between the cylindrical stator and the outer end in the axial direction.

In one implementation, another hub motor system for a vehicle is disclosed. The hub motor system includes a non-rotatable axle extending away from the vehicle in an axial direction and includes an outer end, a cylindrical axle hub disposed between the vehicle and the outer end that extends radially outward away from the non-rotatable axle, and a wheel disposed between the cylindrical axle hub and the outer end. The wheel includes an outer wheel surface, an inner wheel surface, a wheel hub, and a wheel rim. The wheel hub is supported by the non-rotatable axle and is rotatable about a rotational axis that coincides with the axial direction, and the wheel hub extends radially outward away from the non-rotatable axle. The wheel rim is attached to and circumferentially extends about the wheel hub. The wheel rim includes an outer rim portion that extends axially away from the outer wheel surface, an inner rim portion that extends axially away from the inner wheel surface, and an outer rim surface configured to receive a tire. The cylindrical axle hub is disposed proximate to the inner wheel surface and the inner rim portion. The hub motor system includes a hub motor disposed between the wheel hub and the outer end in the axial direction. The hub motor includes a cylindrical rotor and a cylindrical stator coaxially spaced from the cylindrical rotor along the non-rotatable axle. The cylindrical rotor includes a rotor attachment to selectively couple the cylindrical rotor to the non-rotatable axle. The cylindrical stator is disposed between the cylindrical rotor and the wheel hub and includes stator attachments to selectively couple the cylindrical stator to the outer wheel surface. The cylindrical rotor and the cylindrical stator are selectively attachable to the non-rotating axle and the outer wheel surface, respectively, without removing the wheel from the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
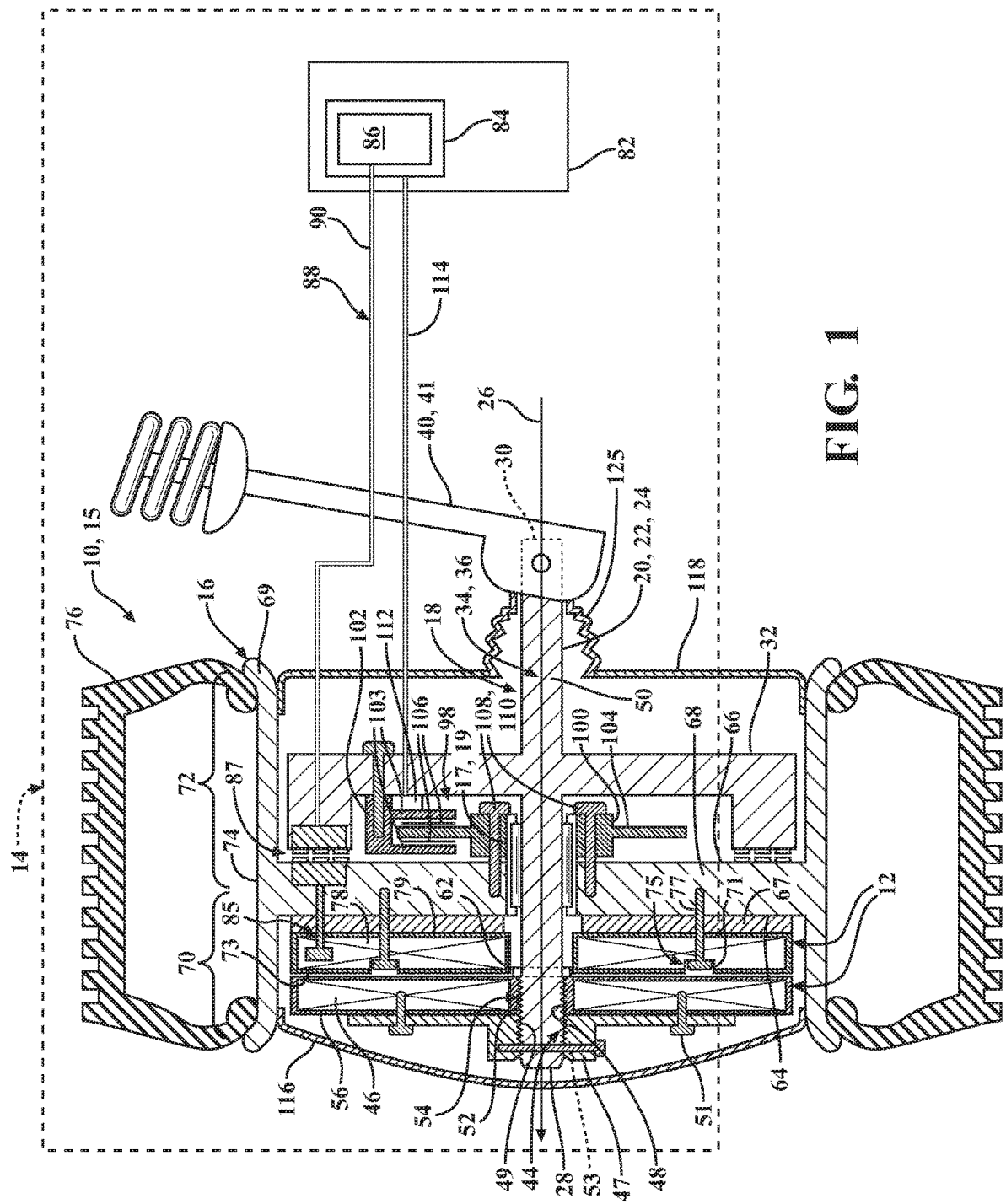
FIG. 1 illustrates a cross-sectional view of one embodiment of a hub motor system for a vehicle.

Systems, method, and other embodiments associated with a hub motor having a novel configuration that provides for selective attachment/detachment from a wheel while the wheel remains mounted to a vehicle are disclosed. To enable such a feature, a hub motor system, in one embodiment, provides for a decoupling of the hub motor from the wheel and tire. For example, the hub motor has a novel configuration of attachment components that provide for securing the hub motor to an outward-facing surface of a vehicle wheel. The attachment components include a rotor and a stator, and the outward placement of the rotor and the stator permit a vehicle user to attach/detach the hub motor from the wheel. For example, the vehicle user can attach/detach the rotor and the stator by engaging with accessible mechanical mechanisms that couple the attachment components to the wheel without disturbing the wheel or tire mounting. The outer disposition and associated accessibility of the hub motor, as well as the mechanical coupling mechanisms, not only allow for serviceability of the attachment components, but also provides for a method of converting a wheel without a hub motor (i.e., a non-motive wheel) to a motorized wheel that includes a hub motor (i.e., a motive wheel). For example, the hub motor system offers the ability to reconfigure a vehicle with non-motive wheels on front axles and motive wheels on rear axles (e.g., a rear-wheel drive (RWD) vehicle) to a front-wheel drive (FWD) vehicle by swapping the accessible attachment components from the rear wheels to the front wheels. Additionally, an upgrade to an all-wheel drive (AWD) or a 4-wheel drive (4WD) vehicle from a FWD/RWD vehicle is possible by adding additional hub motors to non-motive wheels.

The decoupling aspect and associated accessibility of the hub motor system offer more versatility and convenience in the service, repair, replacement, and upgrade of the hub motors, as well as reconfiguration capability of the electrified powertrain drive scheme. For example, swapping hub motors between wheels and/or adding hub motors to non-motive wheels allow for additional tractive ability, higher performance (e.g., AWD capability for towing), energy savings (e.g., downgrading an AWD vehicle to a two-wheel drive (2WD) vehicle), etc. Furthermore, a vehicle configured for 2WD, such as for commuter or city driving, can be changed temporarily to an AWD/4WD configuration for an event, such as a vacation or road trip or for off-road use, and then changed back to the 2WD configuration when the event is over. It should be appreciated that the actual alignment of hub motor components may prove beneficial for certain applications. For example, an axial arrangement of the rotor and stator, as illustrated and disclosed herein, may produce a higher torque as compared to other arrangements of the rotor and stator.

Accordingly, the hub motor, in one embodiment, comprises a cylindrical rotor and a cylindrical stator coaxially spaced from the cylindrical rotor along an axle. The cylindrical rotor includes a rotor attachment to selectively couple the cylindrical rotor to the axle. In one embodiment, the rotor attachment includes threads such that the cylindrical rotor screws onto and is supported by the axle. The cylindrical stator is disposed between the cylindrical rotor and the wheel where the cylindrical stator includes stator attachments to selectively couple the cylindrical stator to an outer wheel surface of the wheel. In one embodiment, the stator attachments include countersinks bored into an outer surface of the cylindrical stator for receiving fasteners that secure the cylindrical stator to the outer wheel surface. In one arrangement, the cylindrical rotor and the cylindrical stator are selectively attachable to the axle and the outer wheel surface, respectively, without removing the wheel from the vehicle. For example, the vehicle user can attach the cylindrical stator to the outer wheel surface using the fasteners and then screw on the cylindrical rotor to the axle, all without interfering with the wheel and tire mounting. Additionally, an accessible electrical interface disposed within the cylindrical stator couples with a rotary power interface in the axle for delivery of electrical power to the hub motor. The controlled electromotive force between the cylindrical stator and the cylindrical rotor generated by the operation of the hub motor drives the rotation of the wheel for propulsion of the vehicle.

Figure 2:
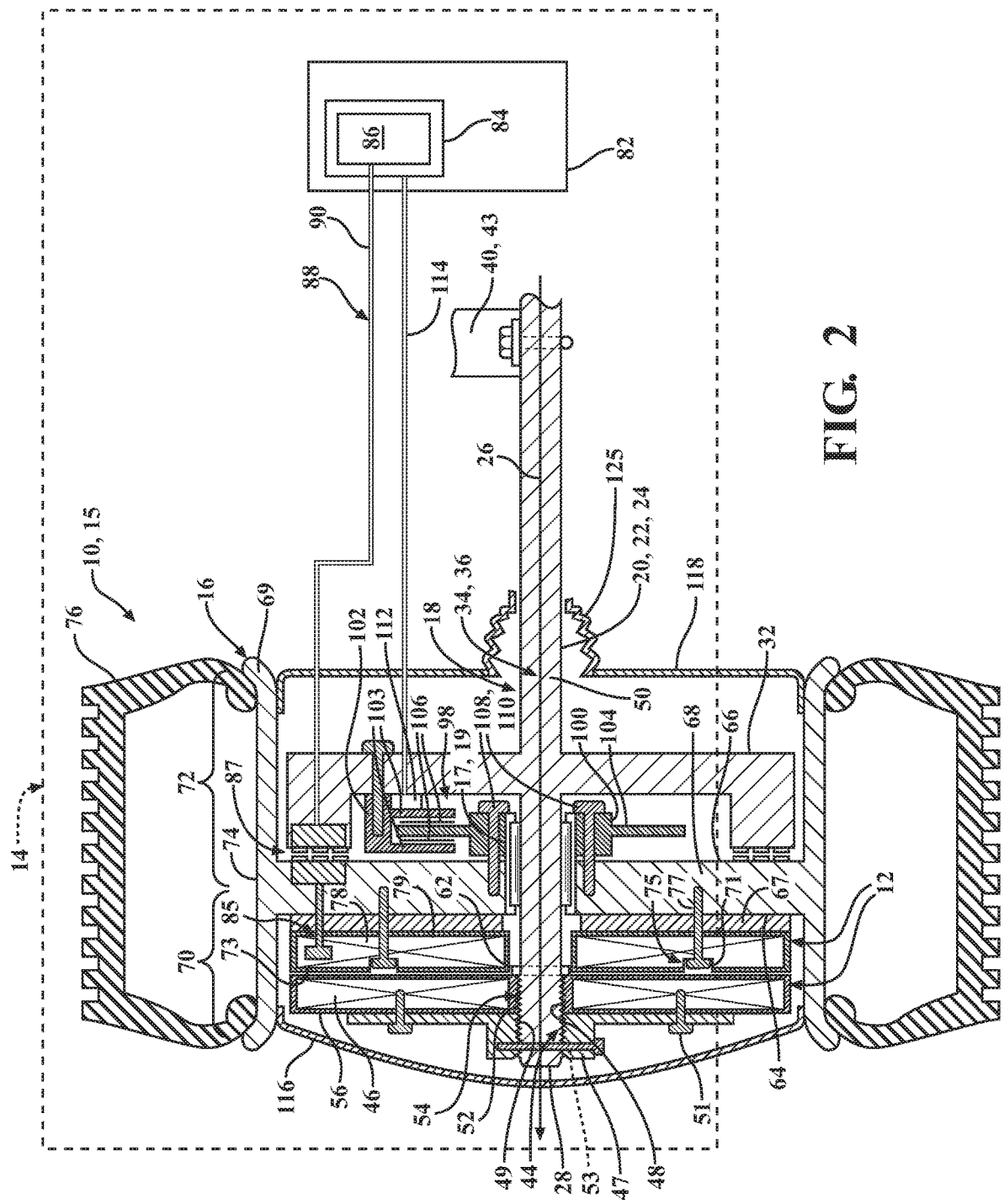
FIG. 2 illustrates a cross-sectional view of another embodiment of a hub motor system for a vehicle.
Figure 3:
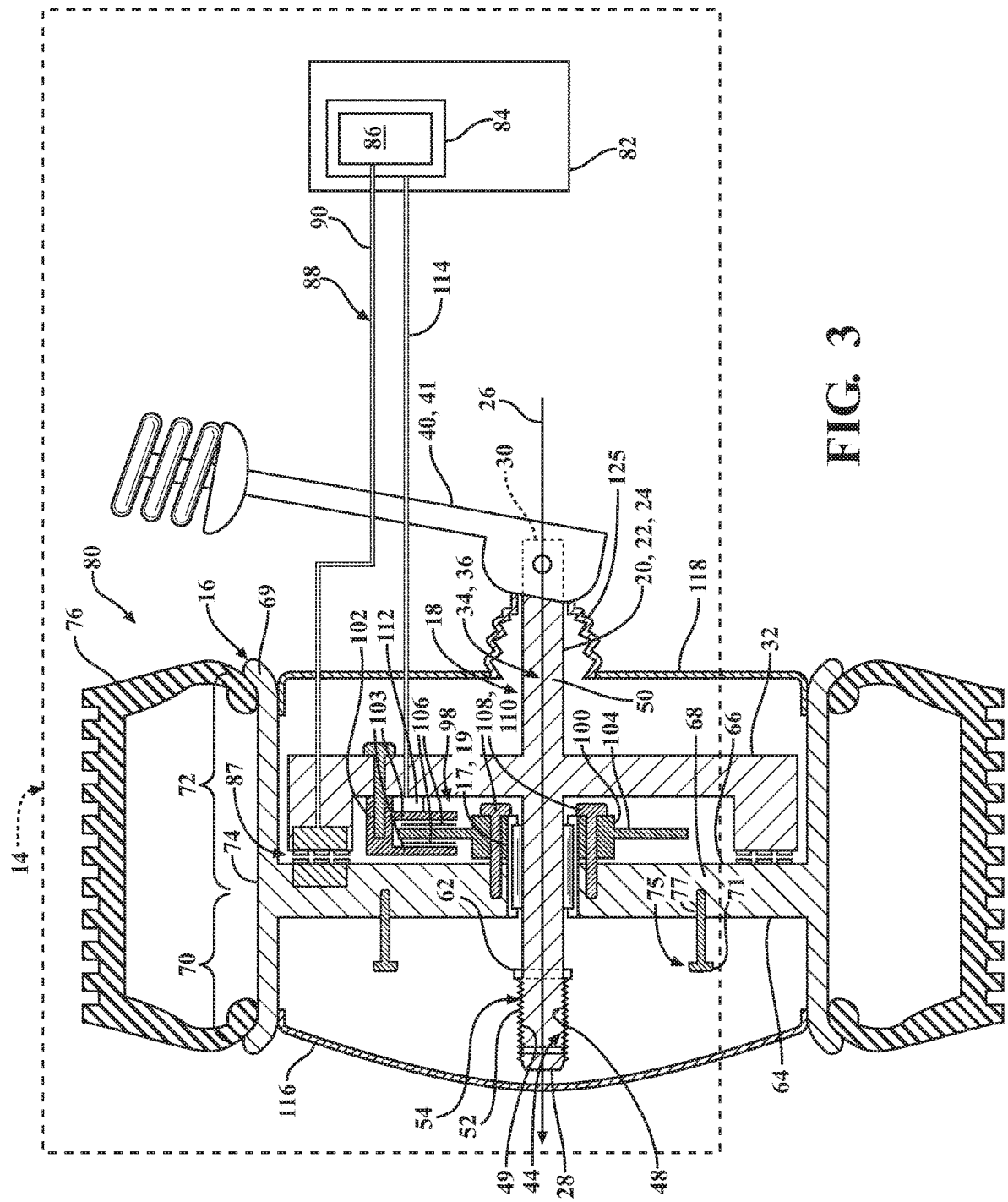
FIG. 3 illustrates a cross-sectional view of a wheel with the cylindrical rotor and cylindrical stator detached.

As illustrated in cross-sectional views in FIGS. 1-3, a hub motor system 10 comprising a hub motor 12 for a vehicle 14 that is selectively attachable and detachable is disclosed. As used herein, the hub motor system 10 refers to a drive or propulsion wheel for a vehicle 14 that is powered by the hub motor 12. In one or more embodiments, the hub motor 12 is an electric motor that is configured to be disposed on a wheel 16 of the vehicle 14 within a space formed by a rim of the wheel 16. In one embodiment, the vehicle 14 may be any type of motorized wheeled vehicle in which vehicle movement is provided, either continuously or selectively, by the hub motor system 10.

The hub motor system 10 is rotatably disposed on a non-rotatable axle 18. The non-rotatable axle 18 is rigidly fixed to the vehicle 14 and does not rotate relative to the wheel 16. The non-rotatable axle 18 may comprise a front axle 20, a rear axle 22, or a supplemental axle 24. The axles 20, 22, and 24 of the vehicle 14, and one or more hub motor systems 10 may comprise steerable wheels or non-steerable wheels.

The vehicle 14, as discussed herein, is any form of motorized transport. In one or more implementations, the vehicle 14 is an automobile. While arrangements will be described herein with respect to automobiles, it will be understood that embodiments are not limited to automobiles. In some implementations, the vehicle 14 may be an electric vehicle (EV) where one ore more hub motors 12 provide all the motive power for the vehicle 14. Alternatively, the vehicle 14 may be a hybrid electric vehicle (HEV) where an internal combustion engine provides a portion of the motive power, and the one or more hub motors 12 provide the remaining motive power to the vehicle 14. In yet other implementations, the vehicle 14 may be any other form of motorized transport (e.g., sport utility vehicles (SUV), trucks, recreation vehicles (RV's), all-terrain vehicles ATV's), buses, etc.) that, for example, benefits from the use the hub motor system 10 discussed herein.

Figure 4:
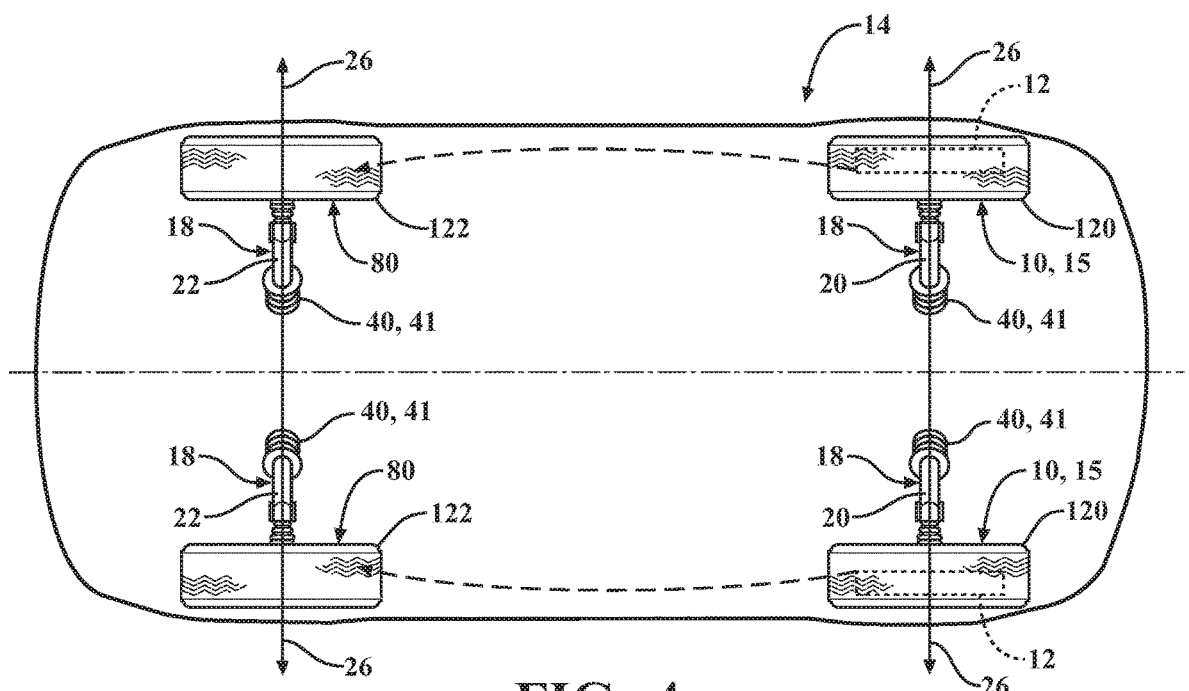
FIG. 4 is a schematic bottom view of an embodiment of a vehicle configured for front-wheel drive (FWD) where two hub motors are detached from front axles and attached to rear axles to convert the FWD vehicle to a rear-wheel drive (RWD) vehicle.
Figure 5:
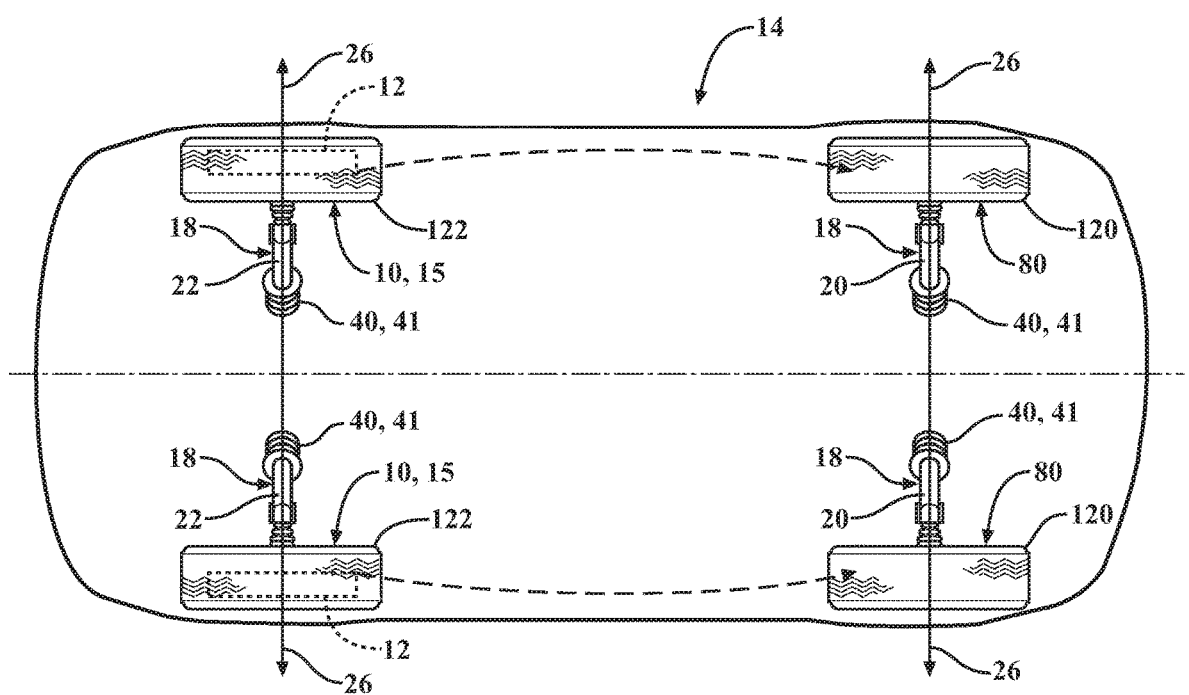
FIG. 5 is a schematic bottom view of an embodiment of a vehicle configured for RWD where two hub motors are detached from rear axles and attached to front axles to convert the RWD vehicle to a FWD vehicle.
Figure 6:
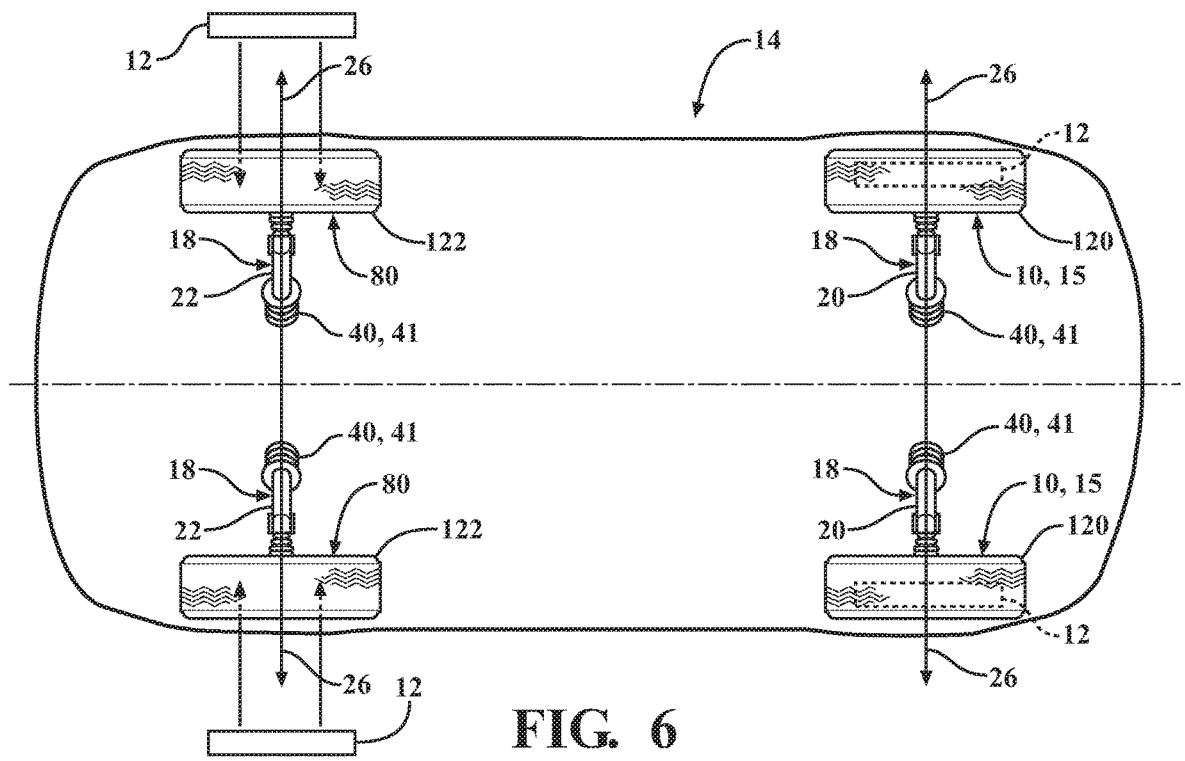
FIG. 6 is a schematic bottom view of an embodiment of a vehicle configured for FWD where two additional hub motors are attached to rear axles to convert the FWD vehicle to an all-wheel drive (AWD) or 4-wheel drive (4WD) vehicle.
Figure 7:
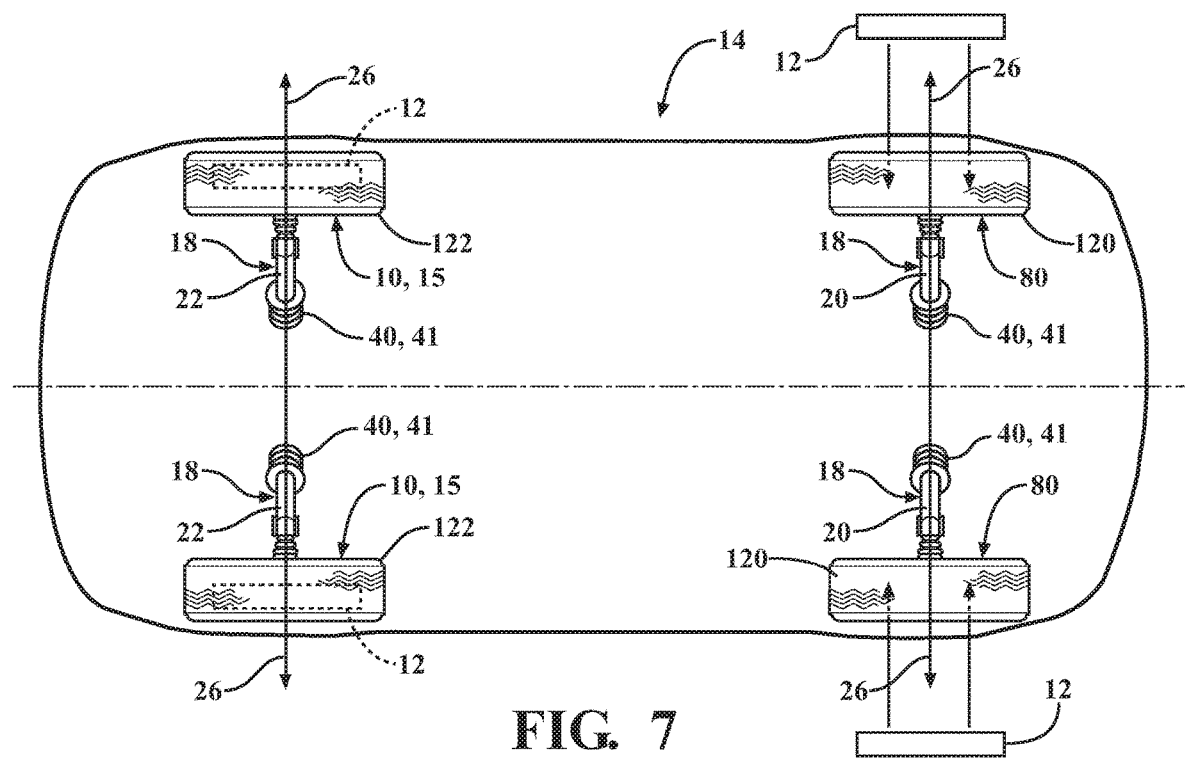
FIG. 7 is a schematic bottom view of an embodiment of a vehicle configured for RWD where two additional hub motors are attached to front axles to convert the RWD vehicle to an AWD/4WD vehicle.
Figure 8:
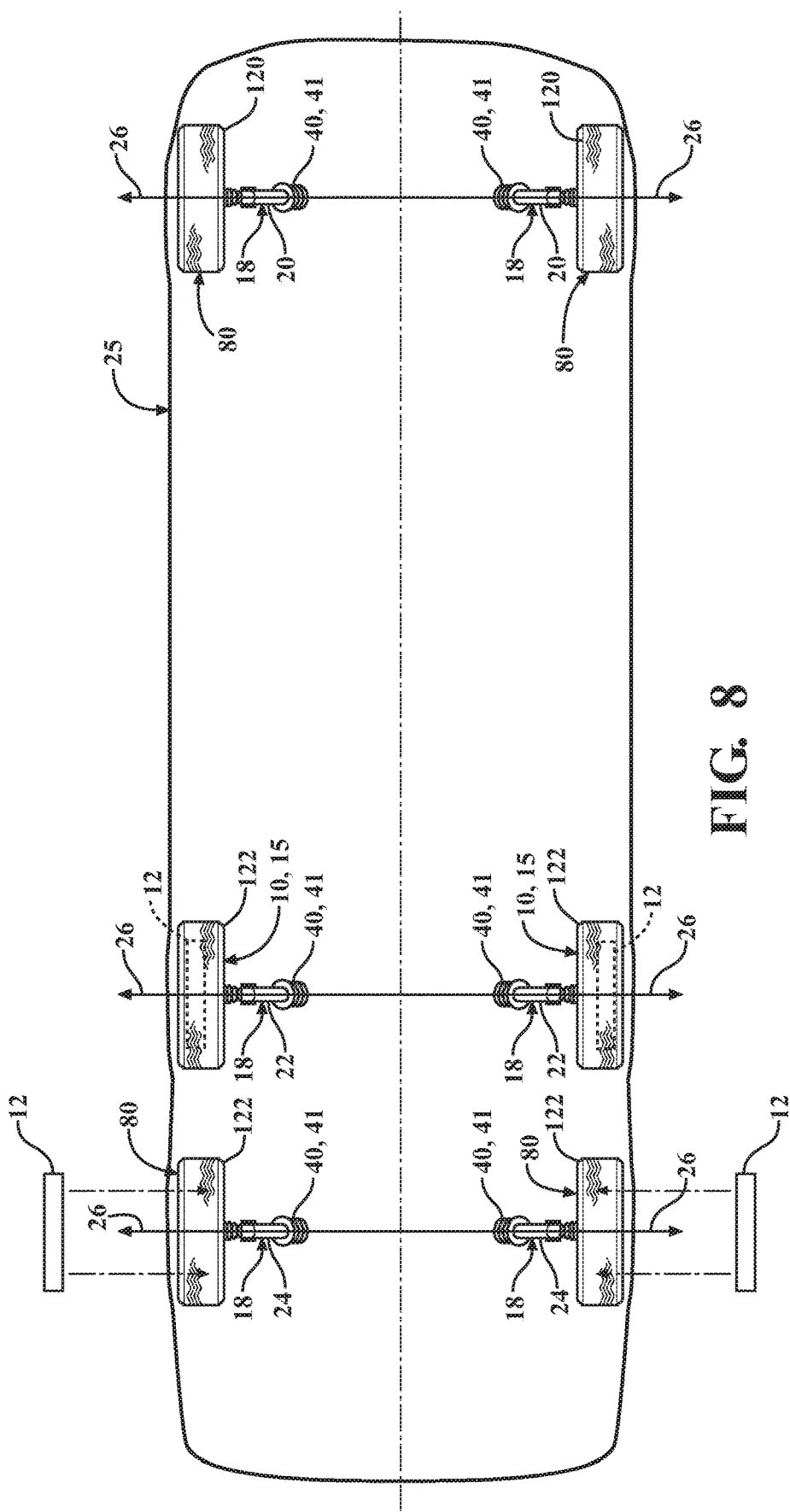
FIG. 8 is a schematic bottom view of an embodiment of a vehicle configured for RWD illustrating hub motors on a rear axle where two additional hub motors are attached to a supplemental rear axle.

The vehicle 14 may utilize the one or more hub motor 12 in various vehicle wheel configurations. As illustrated in FIGS. 4-5, for example, the one or more hub motors 12 may be placed on one side of the vehicle 14 (e.g., on the front axle 20 configured as a discontinuous axle) or both sides of the vehicle 14 (e.g., on the front axle 20 configured as a continuous axle) to provide a FWD vehicle. Alternatively, the one or more hub motors 12 may be placed on the rear axle 22 in a similar manner to provide a RWD vehicle. Additionally, the vehicle 14 may include, for example, four hub motors 12 on the front axle 20 and rear axle 22 to provide an AWD or 4WD vehicle, as illustrated in FIGS. 6-7. The vehicle 14 may apply the hub motor 12, in a similar manner as above, to one or more supplemental axles, such as the supplemental axle 24 in a rear of an RV 25 as illustrated in FIG. 8. Larger vehicles 14 (e.g., multi-axle trucks) may use the one or more supplemental axles 24 to enhance the load carrying or towing capacity of the vehicle 14.

The hub motor system 10 includes the non-rotatable axle 18. The non-rotatable axle 18 is statically mounted to a vehicle suspension, as set forth below, so as to not rotate while permitting other components (e.g., the wheel 16) to rotate about the non-rotatable axle 18. The non-rotatable axle 18 extends away from the vehicle 14 in an axial direction 26 to an outer end 28 of the non-rotatable axle 18. The non-rotatable axle 18 includes an opposed inner end 30 in the case of a discontinuous/independent axle 34, as set forth below, and a cylindrical axle hub 32 disposed inwardly from the outer end (e.g., between the outer end and the vehicle) that extends radially outward away from the non-rotatable axle 18. The cylindrical axle hub 32 may have any suitable cylindrical shape, including various cylindrical disks, such as a hollowed cylindrical disk with an outwardly opening U-shape cross-section, for example, as shown in FIGS. 1-3.

The non-rotatable axle 18, in one arrangement, includes the discontinuous/independent axle 34, such as a wheel spindle 36, that does not extend laterally across the entire width of the vehicle 14. In this case, the non-rotatable axle 18 is configured to support the wheel 16 and for attachment to a vehicle suspension 40, such as an independent vehicle suspension 41, where the mass of the vehicle is apportioned and flexibly and springingly supported (i.e., sprung) independently by each wheel as shown schematically in FIG. 1. Alternately, in one arrangement, the non-rotatable axle 18 may include a continuous axle 42 that does extend laterally across the entire width of the vehicle 14, either as a single piece or as a plurality of mechanically linked pieces. In this case, the non-rotatable axle 18 is joined to and configured to support a pair of wheels 16 to the non-rotatable axle 18 at opposed outer ends 28 thereof as illustrated schematically in FIG. 2. The continuous axle 42 and wheels 16 are also attached to the vehicle suspension 40 together in a dependent suspension 43 configuration where the mass of the vehicle is flexibly and springingly supported (i.e., sprung) on the vehicle suspension 40 dependently by a pair of wheels joined by the non-rotatable axle 18 as also shown in FIG. 2.

The non-rotatable axle 18 may be formed from any suitable material, including various metals, such as various alloys of steel, aluminum, magnesium, and titanium, and composites, such as various polymer/fiber composites. The non-rotatable axle 18 may have any suitable axle configuration, size, or shape, and in one embodiment may comprise a cylindrical axle, including a hollow axle or a solid axle.

The non-rotatable axle 18 comprises an axle attachment 44 for attachment of a cylindrical rotor 46 of the hub motor 12 proximate to the outer end 28. The axle attachment 44 may have any suitable configuration, e.g., screw threads, splines, etc. In one embodiment, the axle attachment 44 comprises a plurality of axle screw threads 48 formed into an outer surface 50 of the non-rotatable axle 18. The axle attachment 44 is configured to engage a plurality of mating attachments, e.g., screw threads, splines, etc. In one embodiment, the axle attachment 44 mates with a plurality of rotor housing screw threads 52 formed into a rotor attachment 54 of a cylindrical rotor housing 56. In one embodiment, the rotor attachment 54 of the cylindrical rotor housing 56 comprises a cylindrical surface and defines a cylindrical opening and the rotor housing screw threads 52 are disposed thereon.

In one embodiment, the cylindrical rotor 46 and cylindrical rotor housing 56 are cylindrical, and the cylindrical rotor 46 is configured for disposition within the cylindrical rotor housing 56. The cylindrical rotor 46 and cylindrical rotor housing 56 are attached to and positioned on the non-rotatable axle 18 via, in one embodiment, the rotor attachment 54 by threading the cylindrical rotor housing 56 and rotor housing screw threads 52 onto the non-rotatable axle 18. The cylindrical rotor 46 may be detached and removed from the non-rotatable axle 18 by unthreading the cylindrical rotor housing 56 and rotor housing screw threads 52 from the non-rotatable axle 18 and axle screw threads 48. Other suitable attachments 44, 54 are possible for securing the cylindrical rotor housing 56 and the cylindrical rotor 46 to the non-rotatable axle 18, such as cotter pins, ring clips, lugs, splines, etc.

The cylindrical rotor 46 may be secured onto the non-rotatable axle 18 by a cylindrical rotor cap 47 having a cylindrical ring shape that comprises, for example, screw thread, splines, etc. In one embodiment, the cylindrical rotor cap 47 includes cap screw threads 49 on an inner diameter that are configured to matingly engage the axle screw threads 48. In one arrangement, a plurality of axially extending threaded cap fasteners 51 attaches the cylindrical rotor cap 47 to the cylindrical rotor housing 56 and/or cylindrical rotor 46. Additionally, or in the alternative, the cylindrical rotor cap 47 may be further attached to the non-rotatable axle 18 by a radially extending threaded axle fastener 53.

In one arrangement, the position of the cylindrical rotor 46 along the non-rotating axle 18 may be at a predetermined rotor position ($P_R$) as measured along the length of the non-rotating axle 18 from the outer end 28 and/or away from an outer wheel surface 64 of the wheel 16. In one embodiment, the predetermined position ($P_R$) is selected to provide a predetermined axial alignment with a cylindrical stator 78 of the hub motor 12. For example, the predetermined position ($P_R$) may be selected to provide a predetermined axial magnetic flux when the hub motor 12 is powered, as described herein. In one embodiment, a rotor stop 62 disposed on the non-rotatable axle 18 establishes the predetermined position ($P_R$). Any suitable rotor stop 62 may be provided, such as a threaded bolt, threaded pin, a snap ring, or the like, to establish and fix $P_R$ as the cylindrical rotor housing 56 is threaded onto the non-rotating axle 18.

In one embodiment, the cylindrical stator 78 is also fixed in a predetermined position ($P_S$) from the outer wheel surface 64 by a stator spacer 67 disposed between the cylindrical stator 78 and a wheel hub 68 of the wheel 16. The predetermined position ($P_S$) from the outer wheel surface 64 may be defined by a thickness of the stator spacer 67. The defined axial alignment of cylindrical rotor 46 and cylindrical stator 78 is an axial alignment that is configured to provide the magnetic flux for the operation of the hub motor 12. In one embodiment, the stator spacer 67 comprises a cylindrical ring having an inner diameter and outer diameter selected to conform to an inner diameter and outer diameter of the cylindrical stator 78.

The stator spacer 67 may have any suitable size and thickness and may be formed from any suitable material. In one embodiment, suitable spacer materials include various metals, such as alloys of steel, aluminum, magnesium, and titanium. Metals are advantageous materials for use as stator spacers 67, as well being advantageous for use as a cylindrical stator housing 79 and the wheel 16 because they have high thermal conductivity and can be configured as heat sinks to remove heat generated by the hub motor 12, particularly the cylindrical stator 78, during operation.

The cylindrical stator 78, in one arrangement, attaches to the stator spacer 67 and the outer wheel surface 64 using two or more stator attachments 75. Accordingly, the stator attachments 75 include countersinks 71 for receiving threaded stator fasteners 77. In one embodiment, the stator attachments 75 are aligned along the non-rotatable axle 18 in the axial direction 26 to receive the stator fasteners 77 that couple the cylindrical stator 78 to the stator spacer 67 and the outer wheel surface 64. In one arrangement, the countersinks 71 circumferentially extend about an outer stator surface 73 of the cylindrical stator 78 where the countersinks are adjacent to the cylindrical rotor 46. For example, the countersinks penetrate far enough into the cylindrical stator 78 such that the threaded stator fasteners 77 are either flush with the outer stator surface 73 or lie beyond the outer stator surface 73 and recessed within the countersink 71. The threaded stator fasteners 77 may be threaded into a plurality of corresponding hub bores formed within the wheel hub 68.

The hub motor system 10, in one embodiment, includes the wheel 16 disposed between the cylindrical axle hub 32 and the outer end 28. The wheel 16 includes the outer wheel surface 64, an inner wheel surface 66, and the wheel hub 68. The wheel hub 68 extends radially outward away from, and configured for reversible rotatable disposition on, the non-rotatable axle 18. The wheel hub 68 is supported by the non-rotatable axle 18 and is rotatable about a rotational axis that coincides with the axial direction 26. The wheel hub 68 is configured to be rotatably disposed on the non-rotatable axle 18. The rotatable disposition may be accomplished by any suitable rotatable device 17, including various configurations of rotatable bushings or bearings. In one embodiment, the rotatable device 17 comprises a wheel bearing 19. The wheel bearing 19 may comprise any suitable type of bearing or bearing configuration sufficient to rotatably support the sprung mass of the vehicle 14 and unsprung mass of the hub motor system 10.

The wheel 16 includes, in one arrangement, a wheel rim 69 that is attached to and circumferentially extending about the wheel hub 68. The wheel rim 69 comprises an outer rim portion 70 that extends axially away from the outer wheel surface 64 and an inner rim portion 72 that extends axially away from the inner wheel surface 66. The wheel rim 69 also comprises an outer rim surface 74 configured to receive a tire 76. The cylindrical axle hub 32 is disposed proximate the inner wheel surface 66 and the inner rim portion 72. The wheel may have any suitable size, including any suitable wheel diameter or width of the wheel hub 68 or the wheel rim 69. The size of the wheel 16 may be selected, and the wheel configured to accept a tire 76 of any size. The wheel 16 may be made from any suitable high strength material, including various metals, such as, for example, alloys of steel, aluminum, titanium, and magnesium.

The hub motor system 10 includes the hub motor 12 that, in one embodiment, is selectively attachable and detachable from the wheel 16. The hub motor 12 is disposed between the wheel hub 68, i.e., the outer wheel surface 64, and the outer end 28 in the axial direction 26. The hub motor 12 includes the cylindrical rotor 46 and the cylindrical stator 78 coaxially spaced from the cylindrical rotor 46 along the non-rotatable axle 18. The cylindrical rotor 46 includes the rotor attachment 54 to selectively couple the cylindrical rotor 46 to the non-rotatable axle 18. The cylindrical stator is disposed between the cylindrical rotor and the wheel hub 68. The cylindrical stator 78 includes the stator attachments 75 to selectively couple the cylindrical stator 78 to the outer wheel surface 64. Furthermore, in one embodiment, the cylindrical rotor 46 and the cylindrical stator 78 are selectively attachable to the non-rotating axle 18 and the outer wheel surface 64, respectively, without removing the wheel 16 from the vehicle 14.

In one embodiment, the cylindrical rotor 46 is disposed in the cylindrical rotor housing 56 and the cylindrical stator 78 is disposed in a cylindrical stator housing 79. The spacing of the cylindrical rotor housing 56 from the cylindrical stator housing 79 is axial along the non-rotatable axle 18 in the axial direction 26. The material composition of the cylindrical rotor housing 56 and cylindrical stator housing 79 may be of the same material or different housing materials. Suitable housing materials include various metals, such as alloys of steel, aluminum, magnesium, and titanium, various filled and unfilled engineering plastics, such as carbon and glass fiber-reinforced plastics, and combinations and composites thereof. Because the wheel hub 68 is rotatably disposed on the non-rotatable axle 18, the cylindrical stator 78 and the cylindrical stator housing 79 are rotatable about non-rotatable axle 18 due to their attachment to the wheel hub 68.

The hub motor 12 may comprise any suitable type of axial flux electric machine comprising a fixed or non-rotatable cylindrical rotor 46, and a rotatable cylindrical stator 78 disposed between the cylindrical rotor 46 and the wheel hub 68 as described herein. The hub motor 12 may comprise any suitable type of electric motor having the configuration of the cylindrical rotor 46 and the cylindrical stator 78 described herein, including various alternating current (AC) and direct current (DC) powered electric motors, and including both brushed (BDC) and brushless (BLDC) motors. The hub motor 12 may comprise conventional electric motor designs. In one embodiment, the hub motor 12 may comprise an AC electric motor and power electronics (e.g., power converters, power inverters, etc.) to condition the voltage and current needed by the AC electric motor. For example, a power inverter, as known in the art, transforms a DC voltage and current from a vehicle battery to an appropriate AC voltage and current needed by the AC electric motor.

The vehicle 14 includes an energy storage device utilized for vehicle propulsion. For example, the energy storage device may include batteries, fuel cells, etc. In one embodiment, the vehicle 14 includes a vehicle battery 82 that comprises any suitable battery electrodes and electrolytes, including those comprising lithium-ion and lithium-ion polymer batteries. The vehicle battery 82 can be configured to provide voltage and power levels suitable for vehicle propulsion.

In one embodiment, the power electronics are disposed in the hub motor 12, particularly the cylindrical stator 78, or elsewhere in the vehicle 14. For example, a vehicle controller 84, a motor controller 86, and/or the vehicle battery 82, may include the power electronics. Alternatively, in a separate embodiment, the power electronics are a standalone device of the vehicle 14. Electrical power (e.g., high voltage DC or AC power—the type depending on the location of the power electronics) may be supplied to the hub motor 12 by any suitable electrical power and/or signal transmission device 88, such as an electrical power bus 90. For example, the electrical power bus 90 includes electrical conductors of appropriate gauge size to transfer the electrical current from the power electronics to the hub motor 12 without significant power loss.

The electric power for operation of the hub motor 12 is provided by the vehicle battery 82 through a series of electrical connection mechanisms to the cylindrical stator 78. For example, the series of electrical connection mechanisms include an electrical interface 85 of the hub motor 12, a rotary power interface 87 and the electrical power bus 90. In one embodiment, the electrical interface 85 is disposed within the cylindrical stator 78 and includes an exposed and accessible connector for coupling with the rotary power interface 87. Further, the rotary power interface 87 couples with the electrical power bus 90. The series of electrical connection mechanisms allow the hub motor to receive the electrical power from the vehicle battery 82 to power and control the hub motor 12.

The rotary power interface 87, for example, may include one or more electrical slip rings disposed on and between the wheel hub 68, i.e., the inner wheel surface 66, and the cylindrical axle hub 32. In one embodiment, the rotary power interface 87 electrically connects with the exposed connector of the electrical interface 85, which is rotatable, and the electrical power bus 90 disposed in the cylindrical axle hub 32, which is not rotatable. It should be appreciated that the electrical power bus 90 can be disposed within the non-rotatable axle 18 as well. The exposed connector of the electrical interface 85 can be, for example, a pigtail including a direct connection to the cylindrical stator 78 and connectable to the rotary power interface on the wheel hub 68. As another example, the exposed connector can directly interface to a wiring harness located in the wheel hub 68 that includes the rotary power interface 87.

In one or more arrangements, the signal transmission device 88 includes a low power wiring harness for controlling the hub motor 12. For example, the low power wiring harness may be wired alongside the electrical power bus 90 and connected from the motor controller 86 or vehicle controller 84 through the rotary power interface 87 and the electrical interface 85 to the cylindrical stator 78.

In one embodiment the hub motor system 10 includes a mechanical friction brake 98 coupled to the non-rotatable axle 18 and the wheel 16. For example, the position of the mechanical friction brake 98 is between the wheel 16 and the vehicle 14 in the axial direction 26. The mechanical friction brake 98 is configured to apply a mechanical braking force to the wheel 16 and the tire 76 to slow the vehicle 14 when it is in motion, or to maintain the position of the vehicle 14 when it is at rest.

In one embodiment, the mechanical friction brake 98 comprises a cylindrical brake rotor 100 and a brake caliper 102. The cylindrical brake rotor 100 is configured for reversible rotatable disposition on and extending radially outward away from the non-rotatable axle 18 to a caliper portion 104. The cylindrical brake rotor 100 is also configured for attachment to the wheel hub 68. The brake caliper 102 comprises selectively movable opposed caliper legs 103 and is configured for attachment to the cylindrical axle hub 32. The selectively movable opposed caliper legs 103 are configured to receive opposed selectively movable friction brake pads 106 disposed thereon. The selectively movable opposed caliper legs 103 and selectively movable friction brake pads 106 are configured for pressed engagement against the caliper portion 104 to apply the mechanical braking force. The cylindrical brake rotor 100 is configured for selective attachment and detachment to the inner wheel surface 66 using an attachment device 108. Any suitable attachment device 108 for selective attachment and detachment of the cylindrical brake rotor 100 may be used, such as, for example, a plurality of threaded brake rotor fasteners 110, including threaded bolts or a combination of threaded studs and threaded nuts.

The cylindrical brake rotor 100 comprises a cylindrical ring and the caliper portion 104 and is configured for selective frictional engagement and friction braking of the vehicle 14 with the selectively movable friction brake pads 106 of the brake caliper 102. The brake caliper 102 is configured for actuation as described herein to provide a braking action to the hub motor system 10. The brake caliper 102 may be actuated to move the selectively movable friction brake pads 106 inwardly and compress them against the caliper portion 104 by any suitable actuator, including a hydraulic actuator (not shown) or an electrical actuator 112. The electrical actuator 112 may include any suitable electrical actuator, including an electric motor or an electric solenoid. The electrical actuator, in one arrangement, is controlled and powered by the brake power bus 114 with any suitable vehicle controller (e.g., the vehicle controller 84) and vehicle power source (e.g., the vehicle battery 82), respectively.

In one arrangement, the vehicle controller 84 operates the hub motor system 10 in a driving mode where power from the vehicle battery 82 is applied to the hub motor 12 and used for vehicle propulsion in a forward or reverse direction. The vehicle controller 84, in another arrangement, operates the hub motor system 10 in a freewheeling mode by electrically disconnecting the hub motor 12 from the vehicle battery 82. In one embodiment, the hub motor 12 is configured to operate to provide regenerative braking. For example, a braking signal from vehicle controller 84 to the motor controller 86 may cause the motor controller 86 to command operation of the hub motor 12 in a reverse direction (i.e., a direction of the motor opposite the then-current direction of vehicle travel). Activation of the regenerative braking mode (e.g., when a vehicle user disengages the accelerator pedal) may slow the vehicle 14 in its current direction of travel and cause the hub motor 12 to act as an electrical generator, which further allows the vehicle battery 82 to receive and store the resultant energy. In driving situations where regenerative braking is insufficient to provide sufficient stopping power for the vehicle, the vehicle controller 84 may actuate the brake caliper 102 to provide additional stopping power from a mechanical friction brake 98 as set forth above.

As shown in FIGS. 1-3, in one embodiment, the hub motor system 10 also includes an outer wheel cover 116 and an inner wheel cover 118. The outer wheel cover is configured for disposition on the outer rim portion 70 of the wheel rim 69. The inner wheel cover 118 is configured for disposition on the inner rim portion 72 of the wheel rim 69. In one embodiment, the outer wheel cover 116 is configured to enclose the cylindrical rotor 46, the cylindrical stator 78, and the non-rotatable axle 18. Furthermore, the inner wheel cover 118 is configured to enclose the cylindrical axle hub 32 and the mechanical friction brake 98. In one or more arrangements, the outer wheel cover 116 and inner wheel cover 118 are configured to seal and enclose these components and portions of the wheel 16 to exclude water, dirt, salt, and other contaminants. In one arrangement, the inner wheel cover 118 comprises flexible boot 125 disposed proximate the non-rotatable axle 18.

In one or more arrangements, upon attachment of the cylindrical rotor 46 and the cylindrical stator 78 to the non-rotatable axle 18 and the outer wheel surface 64, respectively, the cylindrical rotor 46, the cylindrical stator 78, and the wheel 16 form a motive wheel 15. Further, upon detachment of the cylindrical rotor 46 and the cylindrical stator 78 from the non-rotatable axle 18 and the outer wheel surface 64, respectively, the wheel 16 forms a non-motive wheel 80. The non-motive wheel 80 is illustrated, for example, in FIG. 3. Advantageously, in one embodiment, the non-motive wheel 80 may be configured to comprise the same construction and same common components as the motive wheel 15. Accordingly, this arrangement enables swapping the hub motor 12 of the motive wheel 15 onto a non-motive wheel 80 without removing the wheel 16 of the vehicle 14. Furthermore, selectively attaching and detaching the cylindrical rotor and the cylindrical stator from the motive wheel and non-motive wheel, enables the vehicle user to change the vehicle drive type from FWD to RWD, and vice versa.

Referring to FIGS. 4-5 as examples of changing drive types, FIG. 4 illustrates the motive wheels 15 as front wheels 120 and the non-motive wheels 80 as rear wheels 122, which configures the vehicle 14 as a FWD vehicle. A subsequent detachment of the hub motors 12 by the vehicle user from the front wheels 120 and attachment of the hub motors 12 to the rear wheels 122 make the front wheels 120 the non-motive wheels 80 and the rear wheels 122 the motive wheels 15, thereby reconfiguring the FWD vehicle to a RWD vehicle. Conversely, FIG. 5 illustrates the non-motive wheels 80 as the front wheels 120 and the motive wheels 15 as the rear wheels 122, which configures the vehicle 14 as a RWD vehicle. A subsequent detachment of the hub motors 12 by the vehicle user from the rear wheels 122 and attachment to the front wheels 120 make the rear wheels the non-motive wheels 80 and the front wheels 120 the motive wheels 15, thereby reconfiguring the RWD vehicle to a FWD vehicle.

FIGS. 6-7 illustrate upgrading the vehicle 14 from either a FWD vehicle (FIG. 6) to an AWD/4WD vehicle, or a RWD vehicle (FIG. 7) to an AWD/4WD vehicle. As shown in FIG. 6, the FWD vehicle includes the motive wheels 15 as the front wheels 120 and the non-motive wheels 80 as the rear wheels 122. By adding hub motors 12 to the rear wheels 122, the vehicle user has reconfigured the vehicle 14 as an AWD/4WD vehicle. Alternatively, as illustrated in FIG. 7, the RWD vehicle includes motive wheels 15 as rear wheels 122 and non-motive wheels 80 as front wheels 120. The vehicle user can upgrade the vehicle 14 to an AWD/4WD vehicle by adding additional hub motors 12 to the front wheels 120.

With reference to FIG. 8, an RV 25 is illustrated with the motive wheels 15 as rear wheels 122, which configures the RV 25 as a RWD vehicle. The vehicle user can upgrade the non-motive wheels 80 to include additional hub motors 12 to the rear wheels 122, as shown in FIG. 8. For example, the addition of the hub motors 12 to the supplemental axles 24 provide additional motive power to the RV 25, thus increasing its towing capability. The reconfiguration can, of course, occur without removing the wheels 16 of the RV 25.

Figure 9:
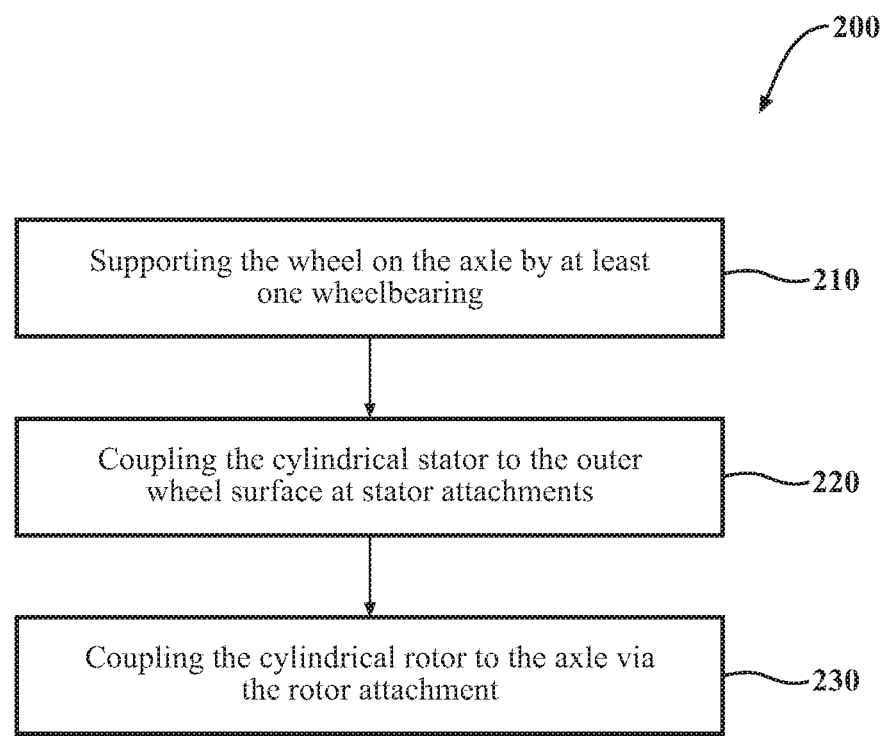
FIG. 9 is a flowchart illustrating one embodiment of a method for manufacturing a hub motor system.

Additional aspects of the hub motor system 10 will be discussed in relation to FIG. 9. FIG. 9 illustrates a flowchart of a method 200 that is associated with manufacturing a hub motor system 10. Method 200 will be discussed from the perspective of the hub motor system 10 and hub motor 12 of FIGS. 1-2. It should be appreciated that the method 200 is not limited to the illustrated method of manufacturing the hub motor system 10, but is instead one example of manufacturing the hub motor system 10, and in particular, attaching the hub motor 12 to the wheel 16 and the non-rotating axle 18.

At 210, the wheel 16 is joined with the non-rotatable axle 18, such that the non-rotatable axle 18 is supporting the wheel 16 by at least one wheel bearing 19. The non-rotatable axle 18 extends away from the vehicle 14 in the axial direction 26 to the outer end 28 of the non-rotatable axle 18. Due to the at least one wheel bearing 19, the wheel 16 is rotatable about the non-rotatable axle 18. The wheel 16 includes a rotational axis coinciding with the axial direction 26.

At 220, the cylindrical stator 78 is joined with the non-rotatable axle 18 by coupling the cylindrical stator 78 to the outer wheel surface 64 of the wheel 16 at the stator attachments 75. The cylindrical stator 78 is disposed in the cylindrical stator housing 79 prior to coupling the cylindrical stator 78 to the outer wheel surface 64. The stator attachments 75 are aligned along non-rotatable axle 18 opposite the axial direction 26 and include countersinks 71 that circumferentially extend about the outer stator surface 73. Additionally, the stator attachments 75 include openings in the cylindrical stator housing 79. The countersinks 71 and the openings of the stator attachments 75 are structured to receive threaded stator fasteners 77. In one embodiment, the threaded stator fasteners 77 are threaded into a plurality of corresponding hub bores formed within the wheel hub 68. When fully seated, the threaded stator fasteners 77 are either flush with the outer stator surface 73 or lie beyond the outer stator surface 73 and recessed within the countersink 71.

At 230, the cylindrical rotor 46 is joined with the non-rotatable axle 18 by coupling the cylindrical rotor 46 to the non-rotatable axle 18 via the rotor attachment 54. The cylindrical rotor 46 is disposed in the cylindrical rotor housing 56 prior to coupling the cylindrical rotor 46 to the non-rotatable axle 18. The rotor attachment 54 includes cylindrical surface on the cylindrical rotor housing 56, which defines a cylindrical opening such that the rotor housing screw threads 52 are disposed thereon. The cylindrical rotor 46 and cylindrical rotor housing 56 are attached to and positioned on the non-rotatable axle 18 via the rotor attachment 54 by threading the cylindrical rotor housing 56 and rotor housing screw threads 52 onto the non-rotatable axle 18. In one embodiment, the cylindrical rotor is secured on the non-rotatable axle 18 by a cylindrical rotor cap 47 and axially extending threaded cap fasteners 51. Furthermore, in one arrangement, the cylindrical rotor cap 47 is secured to the non-rotatable axle 18 by a radially extending threaded axle fastener 53.

As used herein, the terms front or forward or rear or rearward refer to the front or rear of the article or vehicle, or to a direction toward the front or rear of the article or vehicle, respectively. The terms in or inner or inward refer to a direction toward the center of the article or vehicle, and out or outer or outward refers to the opposite direction away from the center or central portion of the article or vehicle. The term selectively attachable and detachable used in reference to a component indicates that a human user or operator may choose to attach or detach the component from the structure with which it is associated or related.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While recited characteristics and conditions of the invention have been described in connection with certain embodiments, it is to be understood that the invention is not to be limited to the disclosed embodiments. Rather, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A hub motor for a wheel of a vehicle, comprising:
   a cylindrical rotor and a cylindrical stator coaxially spaced from the cylindrical rotor along an axle,
   the cylindrical rotor including a rotor attachment to selectively couple the cylindrical rotor to the axle,
   the cylindrical stator disposed between the cylindrical rotor and the wheel, the cylindrical stator including stator attachments to selectively couple the cylindrical stator to an outer wheel surface of the wheel; and
   the cylindrical rotor and the cylindrical stator being selectively attachable to the axle and the outer wheel surface, respectively, without removing the wheel from the vehicle.

2. The hub motor of claim 1, wherein the axle extends in an axial direction away from the vehicle to an outer end of the axle, and the wheel is supported by the axle and rotatable about a rotational axis that coincides with the axial direction, and
   wherein the hub motor is arranged between the outer wheel surface and the outer end in the axial direction.

3. The hub motor of claim 1, wherein the hub motor delivers power to cause the wheel to rotate upon selectable attachment of the cylindrical rotor and the cylindrical stator to the axle and the outer wheel surface, respectively.

4. The hub motor of claim 1, further comprising an electrical interface disposed within the cylindrical stator and having an exposed connector for coupling with a rotary power interface in the axle to receive electrical power from an electrical power bus to power and control the hub motor.

5. The hub motor of claim 1, wherein the stator attachments include countersinks for receiving stator fasteners, the stator attachments being aligned along the axle to receive the stator fasteners that couple the cylindrical stator to the outer wheel surface, and the countersinks circumferentially extend about an outer stator surface of the cylindrical stator adjacent to the cylindrical rotor.

6. The hub motor of claim 1, further comprising a stator spacer disposed between the cylindrical stator and the outer wheel surface and is configured as a heatsink to remove heat generated by the hub motor.

7. The hub motor of claim 1, wherein the hub motor is an axial flux electric machine and is configured to operate to provide regenerative braking.

8. The hub motor of claim 1, wherein the cylindrical rotor is disposed in a cylindrical rotor housing and the cylindrical stator is disposed in a cylindrical stator housing, the cylindrical rotor housing spaced from the cylindrical stator housing along the axle.

9. The hub motor of claim 1, wherein upon attachment of the cylindrical rotor and the cylindrical stator to the axle and the outer wheel surface, respectively, the cylindrical rotor, the cylindrical stator, and the wheel form a motive wheel, and
   wherein upon detachment of the cylindrical rotor and the cylindrical stator from the axle and the outer wheel surface, respectively, the wheel forms a non-motive wheel.

10. The hub motor of claim 9, wherein the motive wheel is a front wheel of the vehicle, and the non-motive wheel is a rear wheel of the vehicle configuring the vehicle as a front-wheel drive (FWD) vehicle, and
    wherein detachment of the hub motor from the front wheel and subsequent attachment of the hub motor to the rear wheel makes the front wheel the non-motive wheel and the rear wheel the motive wheel thereby reconfiguring the FWD vehicle to a rear-wheel drive (RWD) vehicle.

11. The hub motor of claim 9, wherein the motive wheel is a rear wheel of the vehicle, and the non-motive wheel is a front wheel of the vehicle configuring the vehicle as a rear-wheel drive (RWD) vehicle, and
    wherein detachment of the hub motor from the rear wheel and subsequent attachment of the hub motor to the front wheel makes the rear wheel the non-motive wheel and the front wheel the motive wheel thereby reconfiguring the RWD vehicle to a front-wheel drive (FWD) vehicle.

12. A method of manufacturing a hub motor system for a vehicle,
    the hub motor system including:
       an axle extending away from the vehicle in an axial direction to an outer end of the axle,
       a rotatable wheel having a rotational axis coinciding with the axial direction, the rotatable wheel having an outer wheel surface, and
       a hub motor including a cylindrical rotor and a cylindrical stator,
    the method comprising:
       supporting the rotatable wheel on the axle by at least one wheel bearing,
       coupling the cylindrical stator to the outer wheel surface at stator attachments of the cylindrical stator, the cylindrical stator being arranged between the outer wheel surface and the outer end in the axial direction, and
       coupling the cylindrical rotor to the axle via a rotor attachment of the cylindrical rotor, the cylindrical rotor being arranged between the cylindrical stator and the outer end in the axial direction.

13. The method of claim 12,
the hub motor system further including:
- a mechanical friction brake,
- a rotary power interface,
- an inner wheel surface of the rotatable wheel, and
- a cylindrical axle hub of the axle that extends radially outward from the axle, the method further comprising:
  - arranging the cylindrical axle hub between the inner wheel surface and the vehicle in the axial direction,
  - disposing the rotary power interface between the inner wheel surface and the cylindrical axle hub, and
  - arranging the mechanical friction brake between the inner wheel surface and the vehicle.

14. The method of claim 12, wherein the stator attachments include countersinks for receiving stator fasteners, the stator attachments are aligned along the axle for receiving the stator fasteners that couple the cylindrical stator to the outer wheel surface, and the countersinks circumferentially extend about an outer stator surface of the cylindrical stator adjacent to the cylindrical rotor.

15. A hub motor system for a vehicle comprising:
- a non-rotatable axle extending away from the vehicle in an axial direction comprising:
  - an outer end, and
  - a cylindrical axle hub disposed between the vehicle and the outer end that extends radially outward away from the non-rotatable axle;
- a wheel disposed between the cylindrical axle hub and the outer end, comprising:
  - an outer wheel surface,
  - an inner wheel surface,
  - a wheel hub extending radially outward away from the non-rotatable axle, the wheel hub being supported by the non-rotatable axle and rotatable about a rotational axis that coincides with the axial direction,
  - a wheel rim attached to and circumferentially extending about the wheel hub, the wheel rim comprising:
    - an outer rim portion that extends axially away from the outer wheel surface,
    - an inner rim portion that extends axially away from the inner wheel surface,
    - an outer rim surface configured to receive a tire, and
    - the cylindrical axle hub disposed proximate the inner wheel surface and the inner rim portion;
- a hub motor disposed between the wheel hub and the outer end in the axial direction, comprising:
  - a cylindrical rotor and a cylindrical stator coaxially spaced from the cylindrical rotor along the non-rotatable axle,
  - the cylindrical rotor including a rotor attachment to selectively couple the cylindrical rotor to the non-rotatable axle,
  - the cylindrical stator disposed between the cylindrical rotor and the wheel hub,
  - the cylindrical stator including stator attachments to selectively couple the cylindrical stator to the outer wheel surface; and
  - the cylindrical rotor and the cylindrical stator being selectively attachable to the non-rotating axle and the outer wheel surface, respectively, without removing the wheel from the vehicle.

16. The hub motor system of claim 15, further comprising an electrical interface disposed within the cylindrical stator and having an exposed connector for coupling with a rotary power interface disposed between the inner wheel surface and the cylindrical axle hub to receive electrical power from an electrical power bus to power and control the hub motor.

17. The hub motor system of claim 15, further comprising a mechanical friction brake coupled to the non-rotatable axle and the wheel, the mechanical friction brake disposed between the wheel and the vehicle in the axial direction.

18. The hub motor system of claim 15, wherein the stator attachments include countersinks for receiving stator fasteners, the stator attachments being aligned along the non-rotatable axle to receive the stator fasteners that couple the cylindrical stator to the outer wheel surface, and the countersinks circumferentially extend about an outer stator surface of the cylindrical stator adjacent to the cylindrical rotor.

19. The hub motor system of claim 15, wherein the hub motor delivers power to cause the wheel to rotate upon selectable attachment of the cylindrical rotor and the cylindrical stator to the non-rotatable axle and the outer wheel surface, respectively.

20. The hub motor system of claim 15, wherein the non-rotatable axle is one of: an independent axle configured for attachment to at least one of an independent vehicle suspension, and a continuous axle configured for attachment to a vehicle suspension.

\* \* \* \* \*